US012158585B2

(12) United States Patent
Chang et al.

(10) Patent No.: US 12,158,585 B2
(45) Date of Patent: Dec. 3, 2024

(54) WEARABLE DISPLAY DEVICE AND PROJECTION DEVICE

(71) Applicant: Coretronic Corporation, Hsin-Chu (TW)

(72) Inventors: Chih-Wei Chang, Hsin-Chu (TW); Chin-Sheng Chao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/180,799

(22) Filed: Mar. 8, 2023

(65) Prior Publication Data

US 2023/0296903 A1    Sep. 21, 2023

Related U.S. Application Data

(60) Provisional application No. 63/319,776, filed on Mar. 15, 2022.

(30) Foreign Application Priority Data

Jun. 8, 2022   (CN) .......................... 202210643291.0

(51) Int. Cl.
    *G02B 27/01*        (2006.01)
    *F21V 8/00*         (2006.01)
    (Continued)

(52) U.S. Cl.
    CPC ....... G02B 27/0172 (2013.01); G02B 6/0073 (2013.01); G02B 6/4269 (2013.01);
    (Continued)

(58) Field of Classification Search
    CPC ............ G02B 27/0172; G02B 27/0972; G02B 27/0176; G02B 27/18; G02B 27/283; G02B 27/149; G02B 6/0073; G02B 2027/0178
    See application file for complete search history.

(56) References Cited

U.S. PATENT DOCUMENTS

2017/0237935 A1*  8/2017  Totani ................ G02B 27/0176
                                                          348/802
2020/0285050 A1   9/2020  Price et al.
                  (Continued)

FOREIGN PATENT DOCUMENTS

CN         110120992         8/2019
CN         110244503         9/2019
                  (Continued)

OTHER PUBLICATIONS

"Office Action of Taiwan Counterpart Application", issued on Aug. 1, 2023, p. 1-p. 8.

*Primary Examiner* — Xuemei Zheng
(74) *Attorney, Agent, or Firm* — JCIPRNET

(57) ABSTRACT

A wearable display device, including an optical waveguide element and a projection device, is provided. The projection device includes an optical engine main body, a light emitting unit, an optical combiner, a projection lens, and a connection assembly. The light emitting unit is connected to the optical engine main body and configured to emit an illumination beam. The optical combiner is disposed in the optical engine main body, located on a transmission path of the illumination beam, and configured to guide the illumination beam to form an image beam. The projection lens is connected to the optical engine main body, located on a transmission path of the image beam, and configured to project the image beam. The connection assembly includes a flexible circuit board and a system connector. The light emitting unit is connected to the flexible circuit board and electrically connected to the system connector.

24 Claims, 12 Drawing Sheets

(51) Int. Cl.
*G02B 6/42* (2006.01)
*G02B 27/09* (2006.01)
*G02B 27/10* (2006.01)
*G02B 27/18* (2006.01)

(52) U.S. Cl.
CPC ..... *G02B 27/0176* (2013.01); *G02B 27/0972* (2013.01); *G02B 27/18* (2013.01); *G02B 2027/0178* (2013.01)

(56) References Cited

U.S. PATENT DOCUMENTS

2021/0132398 A1* 5/2021 Fujishiro .............. H04R 5/0335
2021/0364796 A1   11/2021 Hwang et al.
2022/0310764 A1*  9/2022 Kodama ............ G02B 27/0176

FOREIGN PATENT DOCUMENTS

| CN | 113490873 | | 10/2021 | |
|----|-----------|---|---------|---|
| CN | 114002898 | | 2/2022 | |
| CN | 116088174 | | 5/2023 | |
| KR | 20240041547 A | * | 4/2024 | ......... G02B 27/0176 |
| TW | 201227082 | | 7/2012 | |
| TW | 202111391 | | 3/2021 | |

* cited by examiner

WEARABLE DISPLAY DEVICE AND PROJECTION DEVICE

CROSS-REFERENCE TO RELATED APPLICATION

This application claims the priority benefit of U.S. Provisional Application No. 63/319,776, filed on Mar. 15, 2022 and China Application No. 202210643291.0, filed on Jun. 8, 2022. The entirety of each of the above-mentioned patent applications is hereby incorporated by reference herein and made a part of this specification.

BACKGROUND

Technical Field

The disclosure relates to a display device and a projection device, and particularly relates to a wearable display device and a projection device included therein.

Description of Related Art

In recent years, the wearable display device with augmented reality (AR) or virtual reality (VR) function has gradually become popular in the consumer market, and the wearable display device projects an image beam to an optical waveguide element by a projection device to provide a user with the image experience of virtual reality. The volume and weight of the wearable display device need to be reduced as much as possible, so as to be easily worn by the user. In the current wearable display device, the projection device mostly adopts the structure of a light emitting diode (LED) module in cooperation with a digital micromirror device (DMD). However, the positioning of each element inside the projection device needs to be performed in cooperation with a complex optical path guidance and imaging system and by a sophisticated optical engine system, which leads to an increase in the volume and weight of the wearable display device.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a wearable display device, and a projection device of the wearable display device meets the design requirements of reducing the volume and weight.

The disclosure provides a projection device that meets the design requirements of reducing the volume and weight.

Other objectives and advantages of the disclosure can be further understood from the technical features disclosed in the disclosure.

In order to achieve one, a part, or all of the above objectives or other objectives, an embodiment of the disclosure provides a wearable display device. The wearable display device includes an optical waveguide element and a projection device. The projection device includes an optical engine main body, at least one light emitting unit, an optical combiner, a projection lens, and a connection assembly. The light emitting unit is connected to the optical engine main body, and the light emitting unit is configured to emit at least one illumination beam. The optical combiner is disposed in the optical engine main body and is located on a transmission path of the illumination beam. The optical combiner is configured to guide the illumination beam to generate an image beam. The projection lens is connected to the optical engine main body, is located on a transmission path of the image beam, and is configured to project the image beam toward the optical waveguide element. The connection assembly includes at least one flexible circuit board and a system connector. The system connector is disposed on the flexible circuit board. The light emitting unit is connected to the flexible circuit board, and the light emitting unit is electrically connected to the system connector through the flexible circuit board.

In order to achieve one, a part, or all of the above objectives or other objectives, an embodiment of the disclosure provides a projection device. The projection device includes an optical engine main body, at least one light emitting unit, an optical combiner, a projection lens, and a connection assembly. The light emitting unit is connected to the optical engine main body, and the light emitting unit is configured to emit at least one illumination beam. The optical combiner is disposed in the optical engine main body and is located on a transmission path of the illumination beam. The optical combiner is configured to guide the illumination beam to generate an image beam. The projection lens is connected to the optical engine main body and is located on a transmission path of the image beam. The connection assembly includes at least one flexible circuit board and a system connector. The system connector is disposed on the flexible circuit board. The light emitting unit is connected to the flexible circuit board, and the light emitting unit is electrically connected to the system connector through the flexible circuit board.

In an embodiment of the disclosure, the light emitting unit includes a first light emitting assembly, a second light emitting assembly, and a third light emitting assembly. The flexible circuit board includes a first configuration portion, a second configuration portion, a third configuration portion, a fourth configuration portion, a first connection portion, and a second connection portion. The first light emitting assembly, the second light emitting assembly, the third light emitting assembly, and the system connector are respectively disposed in the first configuration portion, the second configuration portion, the third configuration portion, and the fourth configuration portion. The first connection portion connects the first configuration portion and the third configuration portion. The second connection portion connects the second configuration portion and the third configuration portion. The first connection portion and the second connection portion are bent, so that the first configuration portion and the second configuration portion are opposite to each other.

In an embodiment of the disclosure, a shape of the first connection portion and a shape of the second connection portion are strip-shaped or U-shaped.

In an embodiment of the disclosure, the light emitting unit includes a first light emitting assembly, a second light emitting assembly, and a third light emitting assembly. The connection assembly further includes a first connector and a second connector. The flexible circuit board includes a first flexible circuit board, a second flexible circuit board, and a third flexible circuit board. The first light emitting assembly and the first connector are disposed on the first flexible circuit board. The second light emitting assembly and the second connector are disposed on the second flexible circuit board. The third light emitting assembly and the system connector are disposed on the third flexible circuit board. The first light emitting assembly and the second light emitting assembly are lapped onto the third flexible circuit board through at least one of the first connector and the second connector.

In an embodiment of the disclosure, the first connector, the second connector, and the system connector are located on a same side of the third flexible circuit board.

In an embodiment of the disclosure, the first connector and the second connector are located on a first surface of the third flexible circuit board, and the system connector is located on a second surface opposite to the first surface of the third flexible circuit board.

In an embodiment of the disclosure, the light emitting unit includes at least one back plate and at least one light emitting assembly. The light emitting assembly is disposed on the back plate.

In an embodiment of the disclosure, the projection device further includes an anti-glue overflow structure, and the optical engine main body includes a positioning surface and multiple connection surfaces. Each connection surface is adjacent to the positioning surface, and the light emitting unit and the projection lens are respectively connected to the connection surfaces of the optical engine main body. The anti-glue overflow structure is disposed on at least one of the connection surfaces. The anti-glue overflow structure is located at at least one of between the optical engine main body and the at least one light emitting unit and between the optical engine main body and the projection lens.

In an embodiment of the disclosure, the optical engine main body includes a positioning portion and a positioning surface. The positioning portion is in a shape of a groove and is located on the positioning surface.

In an embodiment of the disclosure, the optical engine main body includes a positioning portion and a positioning surface. A shape of the positioning portion is N-gon, and N 3. The positioning surface is located on the positioning surface.

In an embodiment of the disclosure, a material of the optical engine main body includes a magnetically conductive material.

In an embodiment of the disclosure, the projection device further includes a heat sink. The heat sink is bent and positioned on the light emitting unit, and the heat sink is located between the light emitting unit and the optical waveguide element.

Based on the above, the embodiments of the disclosure have at least one of the following advantages or effects. In the design of the wearable display device and the projection device of the disclosure, the light emitting unit is connected to the flexible circuit board, and the light emitting unit is electrically connected to the system connector through the flexible circuit board. Since the flexible circuit board is flexible and suitable for being bent and folded to minimize the volume, the projection device of the disclosure may meet the design requirement of reducing the volume. In addition, since the illumination beam emitted by the light emitting unit becomes the image beam after being guided by the optical combiner, the illumination beam may be directly projected to the optical waveguide element by the projection lens to display an image. Compared with the structure of adopting a light emitting diode module in cooperation with a digital micromirror device for a projection device in a conventional head-mounted display device, the wearable display device and the projection device of the disclosure may omit the configuration of the digital micromirror device or other types of light valves, and there is no need to cooperate with a complex optical path guidance and imaging system, which is more in line with the design requirements of reducing the volume and weight.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is configured to purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
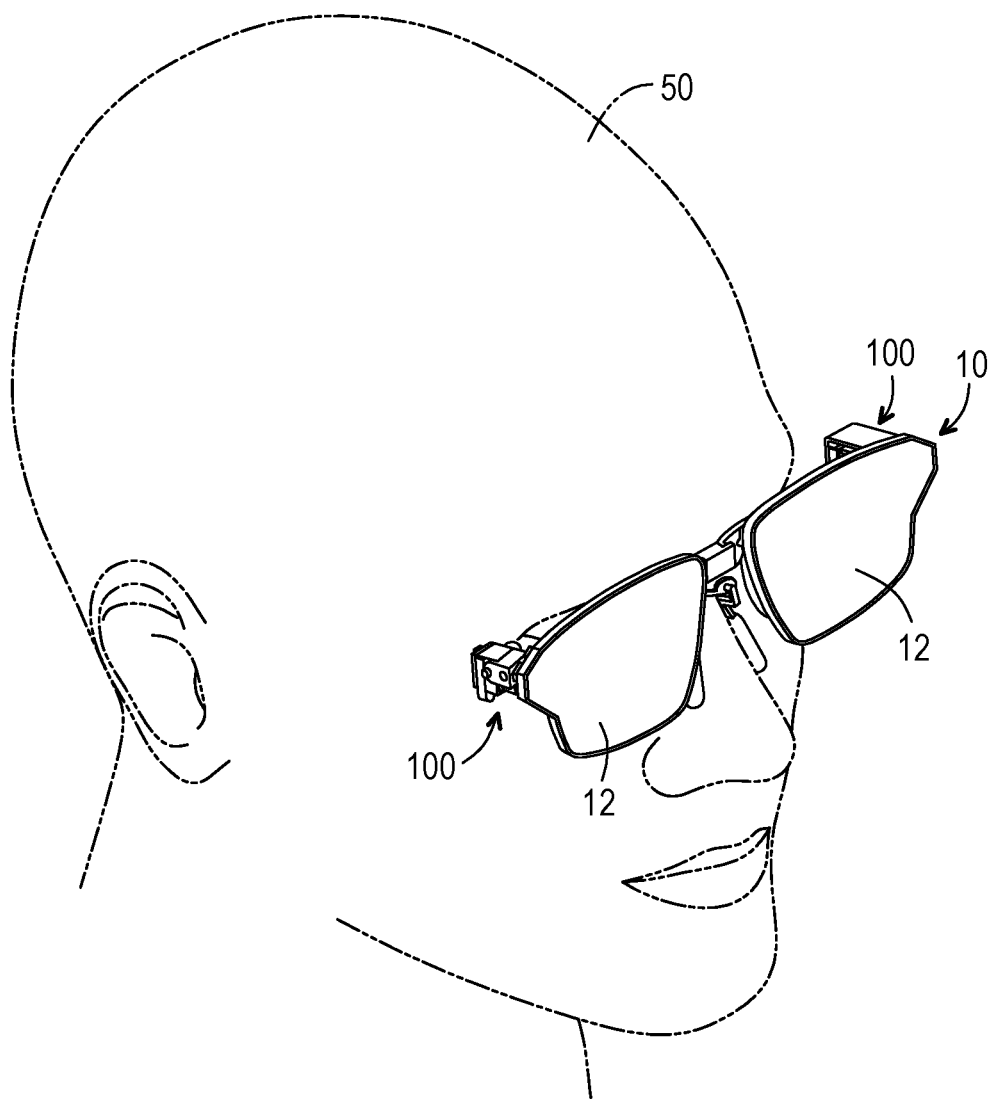
FIG. 1 is a three-dimensional view of a wearable display device worn by a user according to an embodiment of the disclosure.
Figure 2:
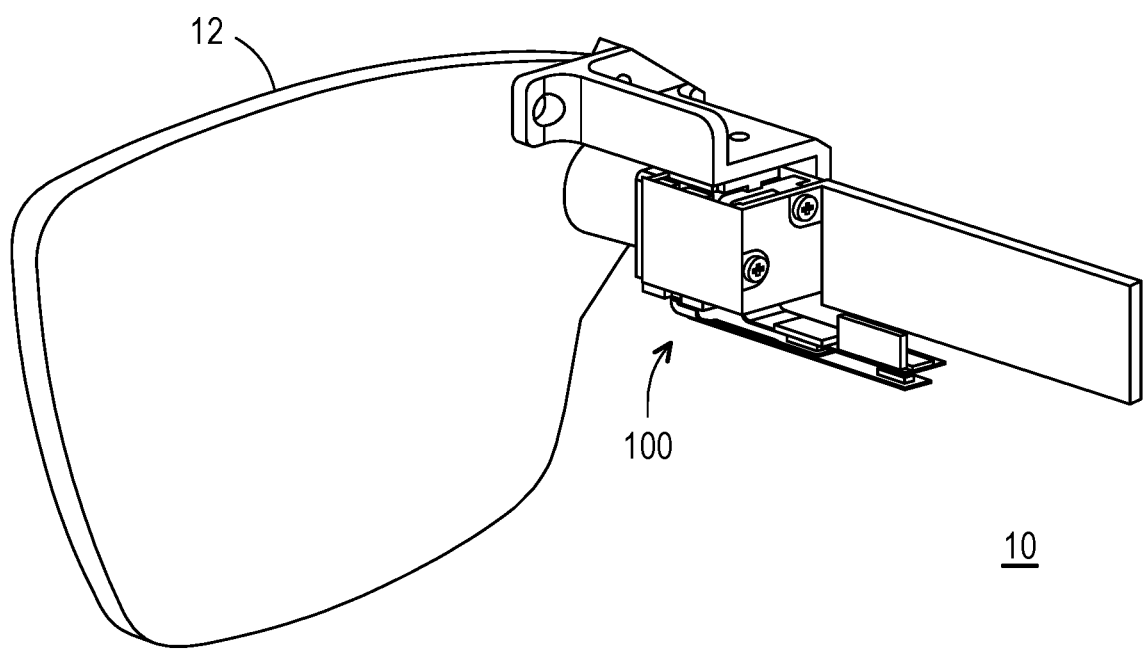
FIG. 2 is a three-dimensional view of some components of the wearable display device of FIG. 1.

FIG. 1 is a three-dimensional view of a wearable display device worn by a user according to an embodiment of the disclosure. FIG. 2 is a three-dimensional view of some components of the wearable display device of FIG. 1. Please refer to FIG. 1 and FIG. 2. A wearable display device 10 of this embodiment includes at least one optical waveguide element 12 (shown as two in FIG. 1) and at least one projection device 100 (shown as two in FIG. 1). The wearable display device 10 may be worn by a user 50 as shown in FIG. 1, so that the two optical waveguide elements 12 respectively correspond to both eyes of the user 50, and each projection device 100 is configured to project an image beam to the corresponding optical waveguide element 12. The optical waveguide element 12 may include an optical structure (not shown) such as a diffractive structure or an optical splitter. The optical waveguide element 12 is configured to provide the user 50 with the image experience of augmented reality (AR) or virtual reality (VR).

Figure 3:
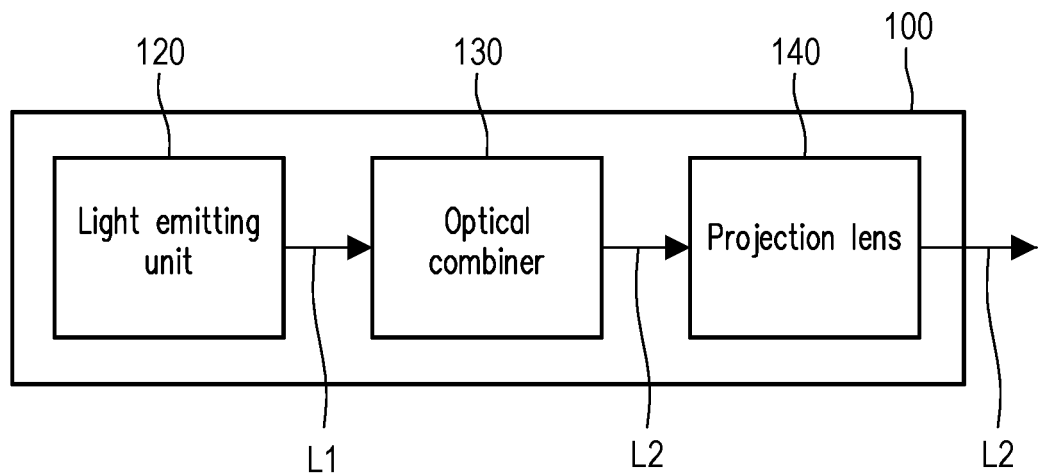
FIG. 3 is a schematic view of a projection device of FIG. 2.
Figure 4:
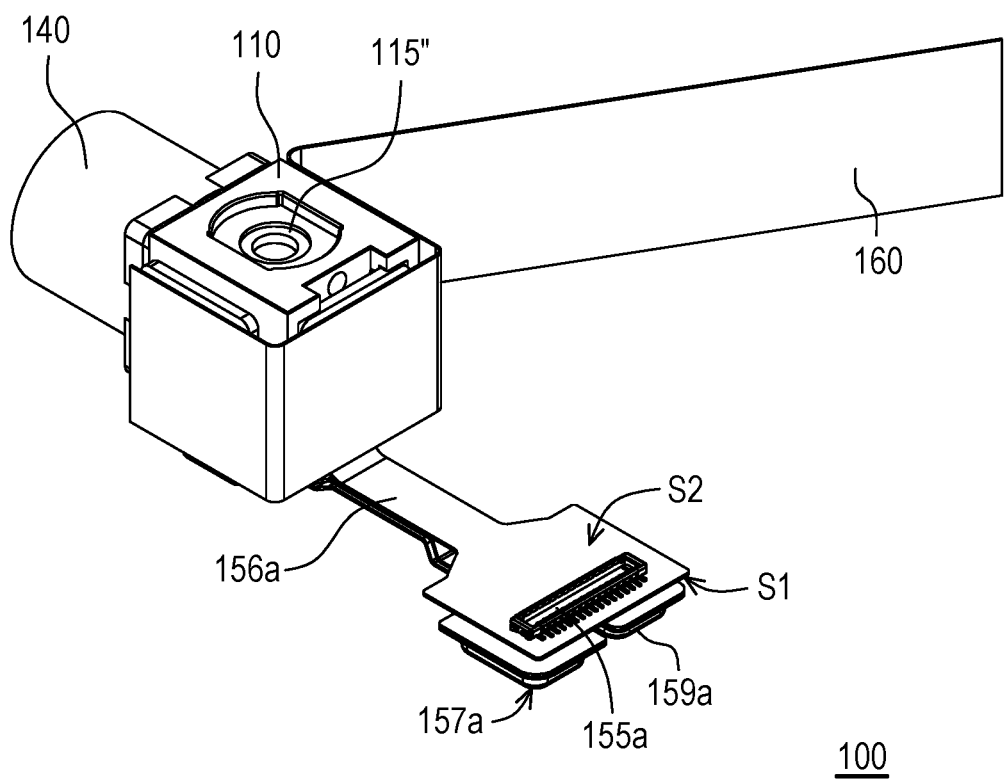
FIG. 4 is a three-dimensional view of the projection device of FIG. 3.
Figure 5:
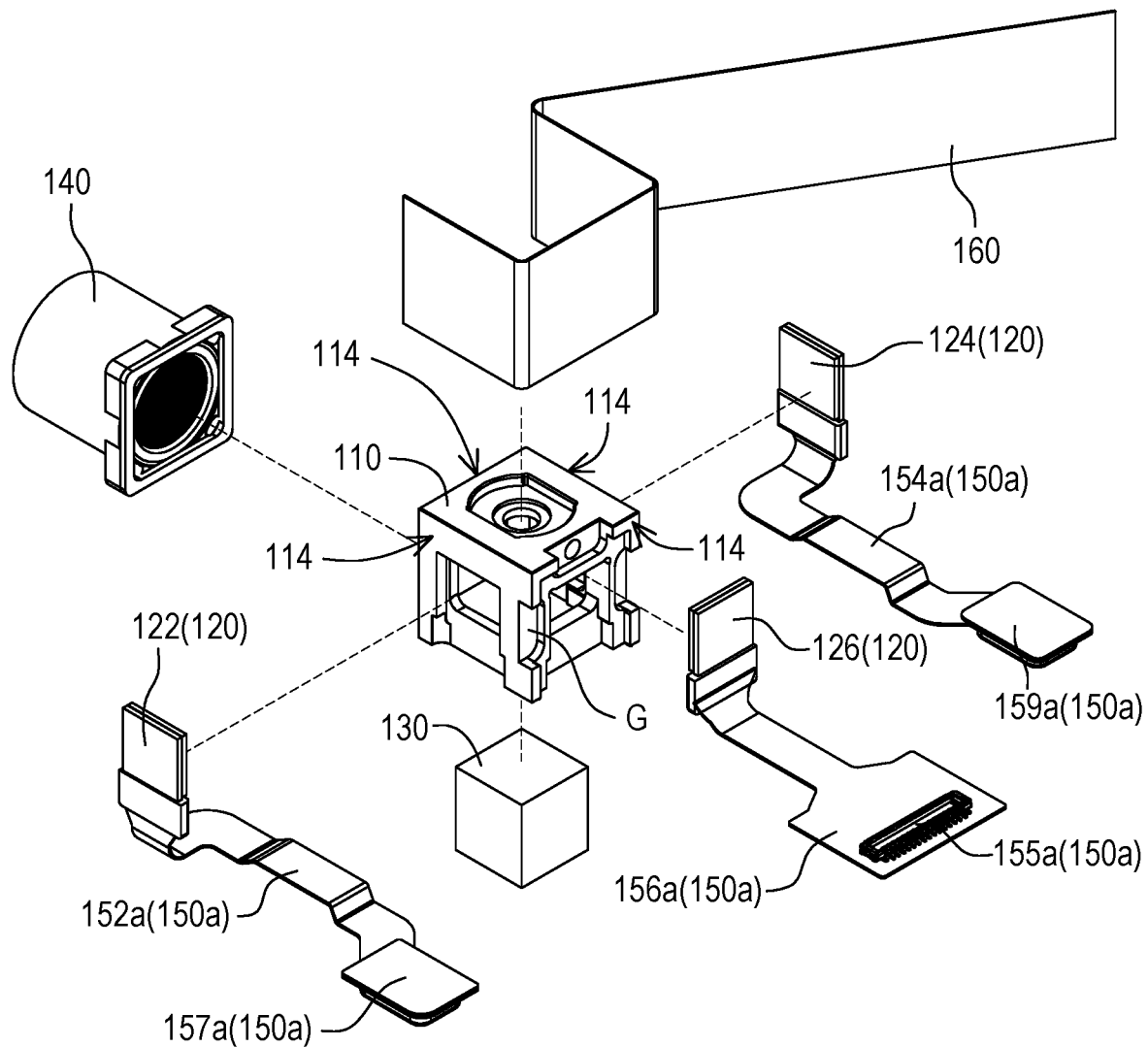
FIG. 5 is an exploded view of the projection device of FIG. 4.

FIG. 3 is a schematic view of a projection device of FIG. 2. FIG. 4 is a three-dimensional view of the projection device of FIG. 3. FIG. 5 is an exploded view of the projection device of FIG. 4. Please refer to FIG. 3, FIG. 4, and FIG. 5 simultaneously. In this embodiment, the projection device 100 includes an optical engine main body 110, at least one light emitting unit 120, an optical combiner 130, a projection lens 140, and a connection assembly 150a. The light emitting unit 120 includes a first light emitting assembly 122, a second light emitting assembly 124, and a third light emitting assembly 126, wherein the light emitting unit 120 is connected to the optical engine main body 110 and is configured to emit at least one illumination beam L1. The first light emitting assembly 122, the second light emitting assembly 124, and the third light emitting assembly 126 are respectively, for example, a red light micro light emitting diode, a blue light micro light emitting diode, and a green light micro light emitting diode. The optical combiner 130 is disposed in the optical engine main body 110 and is located on a transmission path of the illumination beam L1, wherein the optical combiner 130 is configured to guide the illumination beam L1 to generate an image beam L2. The projection lens 140 is connected to the optical engine main body 110, is located on a transmission path of the image beam L2, and is configured to project the image beam L2 toward the optical waveguide element 12 (please refer to FIG. 1 and FIG. 2).

For example, a red light emitted by the red light micro light emitting diode enters the projection lens 140 after being reflected by the optical combiner 130, a blue light emitted by the blue light micro light emitting diode enters the projection lens 140 after being reflected by the optical combiner 130, and a green light emitted by the green light micro light emitting diode enters the projection lens 140 after penetrating the optical combiner 130. The image beam L2 formed by at least one of the red light, the green light, and the blue light is transmitted to the optical waveguide element 12 by the projection lens 140, so that the user may observe an image formed by the image beam L2.

In this embodiment, the first light emitting assembly 122, the second light emitting assembly 124, and the third light emitting assembly 126 may include a micro light emitting diode array composed of multiple light sources. The micro light emitting diode array may at least partially emit light according to the image that needs to be displayed. The red light, the blue light, and the green light (that is, the illumination beam L1) respectively emitted at specific array positions by the light sources, which are embodied as the first light emitting assembly 122, the second light emitting assembly 124, and the third light emitting assembly 126 in this embodiment, may generate the image beam L2 after being guided by the optical combiner 130. The light emitting assembly with the micro light emitting diode array may control the light sources thereof to simultaneously emit light and not emit light or to be sequentially turned on and turned off.

As described above, in the projection device 100 of this embodiment, the illumination beam L1 emitted by the light emitting unit 120 becomes the image beam L2 after being guided by the optical combiner 130, and may be directly projected to the optical waveguide element 12 by the projection lens 140 to display the image. Compared with the structure of adopting a light emitting diode module in cooperation with a digital micromirror device for a projection device in a conventional head-mounted display device, the projection device 100 of this embodiment may omit the configuration of the digital micromirror device or other types of light valves, and there is no need to cooperate with a complex optical path guidance and imaging system, which is more in line with the design requirements of reducing the volume and weight. In this embodiment, the volume of the projection device 100 is, for example, less than or equal to 0.9 cubic centimeters.

Please refer to FIG. 4 and FIG. 5 again. In this embodiment, the connection assembly 150a includes at least one flexible circuit board and a system connector 155a. Here, the flexible circuit boards include a first flexible circuit board 152a, a second flexible circuit board 154a, and a third flexible circuit board 156a. The connection assembly 150a further includes a first connector 157a and a second connector 159a. The first light emitting assembly 122 and the first connector 157a are disposed on the first flexible circuit board 152a. The second light emitting assembly 124 and the second connector 159a are disposed on the second flexible circuit board 154a. The third light emitting assembly 126 and the system connector 155a are disposed on the third flexible circuit board 156a. In other words, each light emitting assembly and the flexible circuit board are in a 1-to-1 form, that is, each light emitting assembly has its own corresponding current route, and the light emitting unit 120 and the connection assembly 150a are in a 3-in-1 form. Since there is no limitation on the mutual movement between the light emitting assemblies, the positioning process of each light emitting assembly is relatively easy.

In this embodiment, the first light emitting assembly 122 and the second light emitting assembly 124 are lapped onto the third flexible circuit board 156a through at least one of the first connector 155a and the second connector 157a. Specifically, the system connector 155a of this embodiment is disposed on the third flexible circuit board 156a, the light emitting unit 120 is connected to the first flexible circuit board 152a, the second flexible circuit board 154a, and the third flexible circuit board 156a. The light emitting unit 120 is electrically connected to the system connector 155a through the first flexible circuit board 152a, the second flexible circuit board 154a, and the third flexible circuit board 156a. And the light emitting unit 120 is connected to a processor (not shown in the drawing) of the projection device 100 through the system connector 155a for signal control. As shown in FIG. 4, the first connector 157a and the second connector 159a are located on a first surface S1 of the third flexible circuit board 156a, and the system connector 155a is located on a second surface S2 opposite to the first surface S1 of the third flexible circuit board 156a.

In an embodiment, the light emitting unit and the connection assembly may also be in a 2-in-1 form, that is, the first flexible circuit board 152a configured with the first light emitting assembly 122 and the second flexible circuit board 154a configured with the second light emitting assembly 124 are integrated into one. The first light emitting assembly 122 and the second light emitting assembly 124 are lapped onto the third flexible circuit board 156a through at least one of the first connector 157a and the second connector 159a.

In addition, the projection device 100 of this embodiment further includes a heat sink 160, wherein the heat sink 160 is bent and positioned on the light emitting unit 120, and the heat sink 160 is located between the light emitting unit 120 and the optical waveguide element 12 (please refer to FIG. 1 and FIG. 2). Here, the heat sink 160 is, for example, a heat dissipating copper foil or graphite sheet, which may not only improve the heat dissipating efficiency, but also reduce the weight of the projection device 100 and improve the assembling flexibility. As shown in FIG. 5, in this embodiment, a non-penetrating bending line (K knife) or a penetrating interval line (stitching line) is designed on the heat sink 160 to facilitate the bending and positioning of the heat sink 160.

Figure 6A:
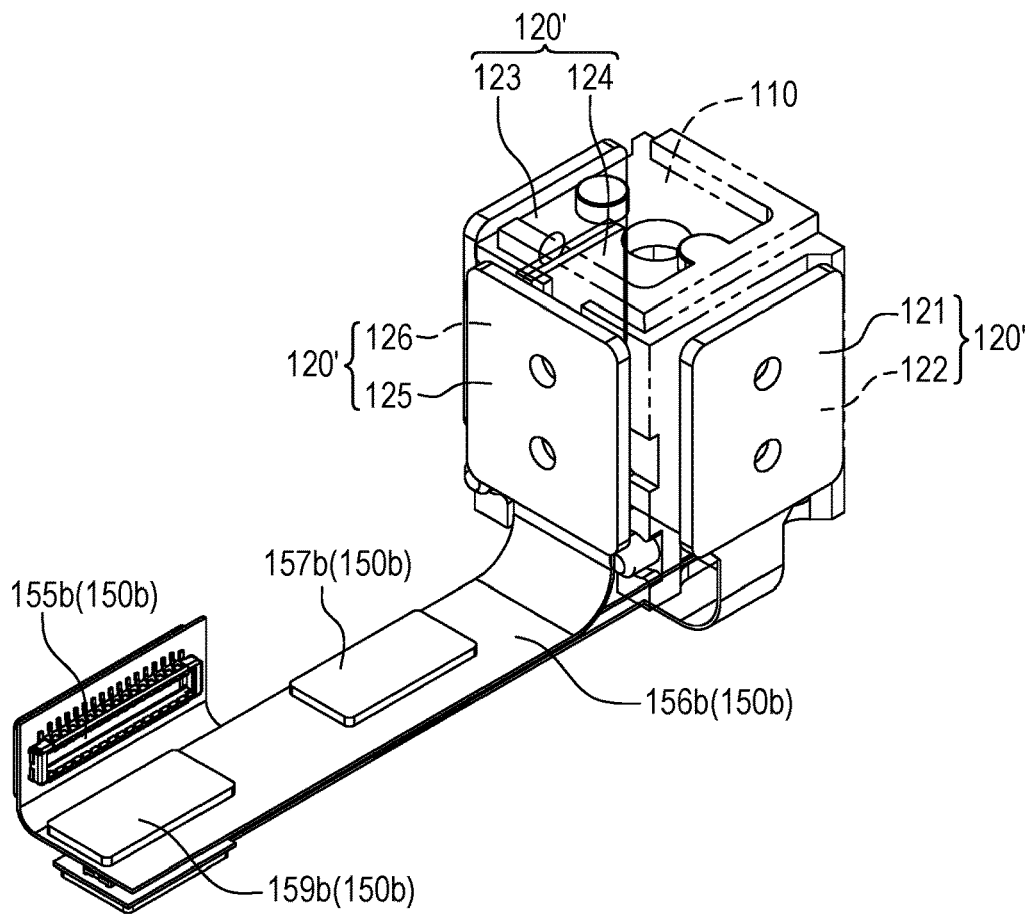
FIG. 6A is a three-dimensional view of a light emitting unit and a connection assembly according to an embodiment of the disclosure.
Figure 6B:
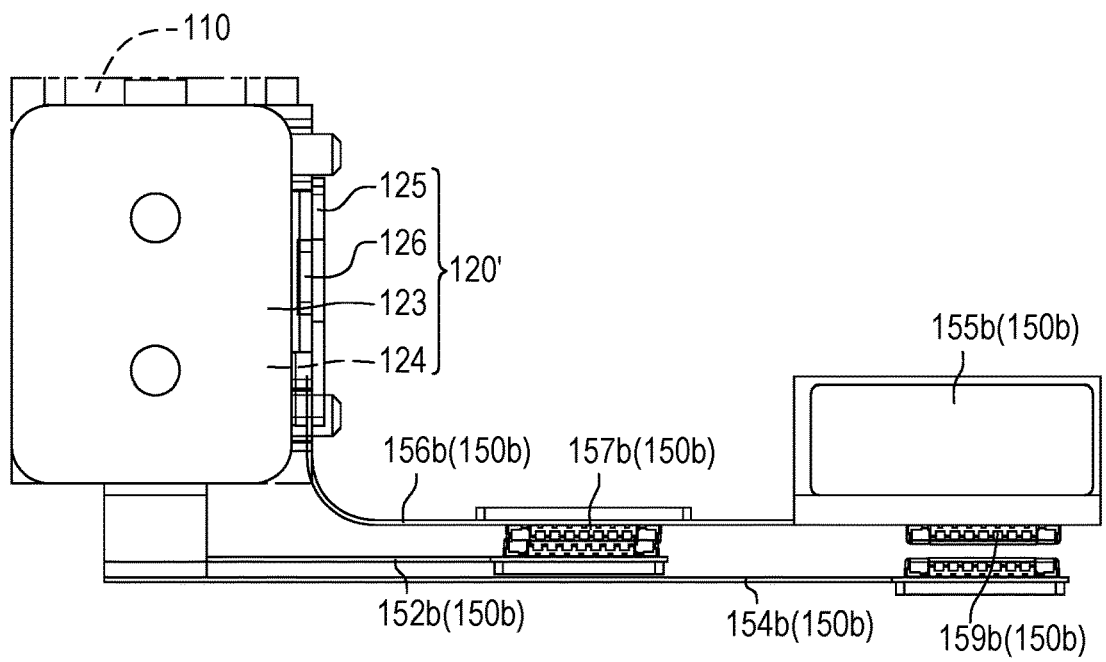
FIG. 6B is a side view of the light emitting unit and the connection assembly of FIG. 6A.

The light emitting unit and the connection assembly of the embodiment of the disclosure have various forms, which are illustrated in the drawings below. FIG. 6A is a three-dimensional view of a light emitting unit and a connection assembly according to an embodiment of the disclosure. FIG. 6B is a side view of the light emitting unit and the connection assembly of FIG. 6A. Please refer to FIG. 6A and FIG. 6B simultaneously. In this embodiment, a light emitting unit 120' further includes at least one back plate (schematically shown as three back plates 121, 123, and 125), and the first light emitting assembly 122, the second light emitting assembly 124, and the third light emitting assembly 126 are respectively disposed corresponding to the back plates 121, 123, and 125. Specifically, the first light emitting assembly 122 and a first connector 157b are disposed on a first flexible circuit board 152b, and at least part of the first flexible circuit board 152b is disposed between the first light emitting assembly 122 and the back plate 121. The second light emitting assembly 124 and a second connector 159b are disposed on a second flexible circuit board 154b, and at least part of the second flexible circuit board 154b is disposed between the second light emitting assembly 124 and the back plate 123. The third light emitting assembly 126 and a system connector 155b are disposed on a third flexible circuit board 156b, and at least part of the third flexible circuit board 156b is disposed between the third light emitting assembly 126 and the back plate 125. The first light emitting assembly 122 and the second light emitting assembly 124 are lapped onto the third flexible circuit board 156b through at least one of the first connector 157b and the second connector 159b. Here, the first connector 157b, the second connector 159b, and the system connector 155b of a lapped connection assembly 150b are located on the same side of the third flexible circuit board 156b, and the light emitting unit 120' is connected to the processor of the projection device 100 by the system connector 155b. In this design, since there is no limitation on the mutual movement between the light emitting assemblies, the positioning process of each light emitting assembly is relatively easy.

Figure 7A:
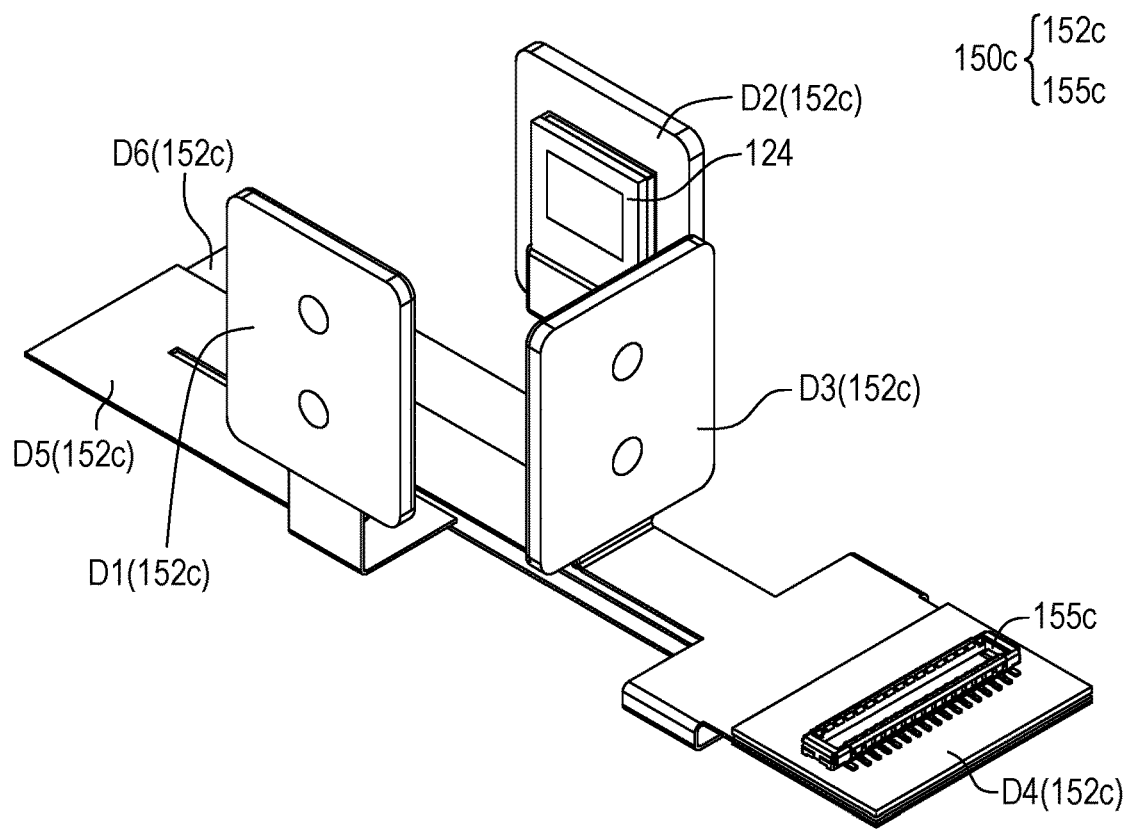
FIG. 7A is a three-dimensional view of a light emitting unit and a connection assembly according to another embodiment of the disclosure.
Figure 7B:
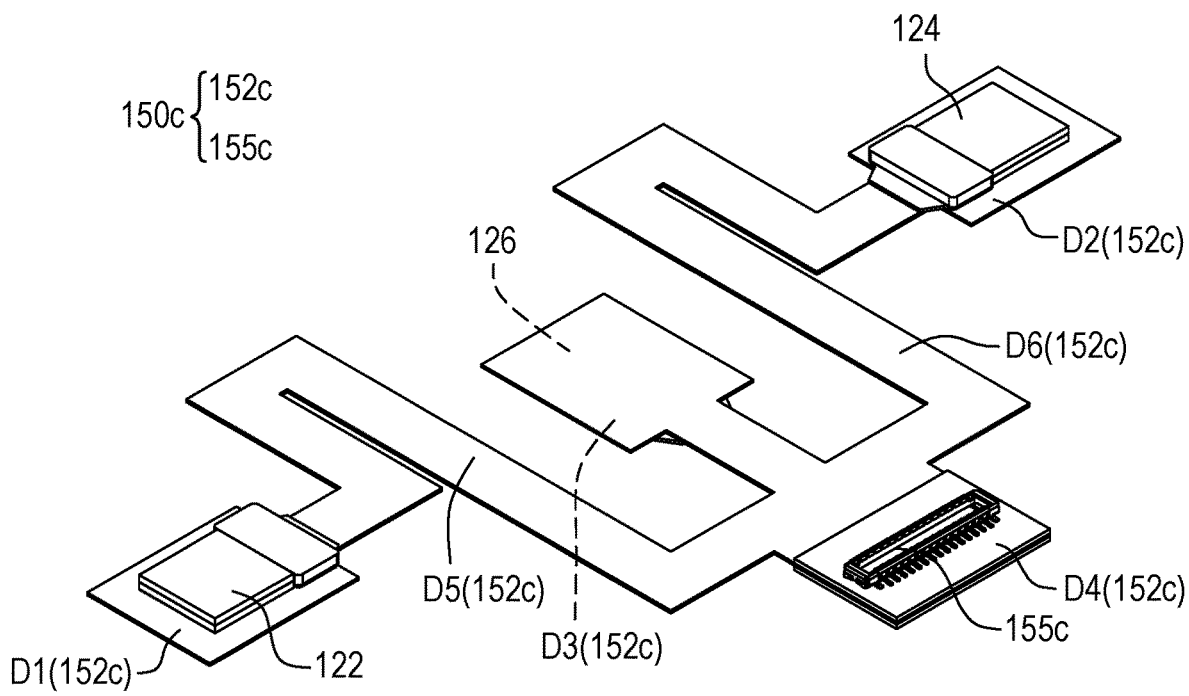
FIG. 7B is a three-dimensional view of the light emitting unit and the connection assembly of FIG. 7A before being bent.

FIG. 7A is a three-dimensional view of a light emitting unit and a connection assembly according to another embodiment of the disclosure. FIG. 7B is a three-dimensional view of the light emitting unit and the connection assembly of FIG. 7A before being bent. Please refer to FIG. 7A and FIG. 7B simultaneously. In this embodiment, a connection assembly 150c includes a flexible circuit board 152c and a system connector 155c. The flexible circuit board 152c includes a first configuration portion D1, a second configuration portion D2, a third configuration portion D3, a fourth configuration portion D4, a first connection portion D5, and a second connection portion D6. The first light emitting assembly 122, the second light emitting assembly 124, the third light emitting assembly 126, and the system connector 155c are respectively disposed on the first configuration portion D1, the second configuration portion D2, the third configuration portion D3, and the fourth configuration portion D4. The first connection portion D5 connects the first configuration portion D1 and the third configuration portion D3. The second connection portion D6 connects the second configuration portion D2 and the third configuration portion D3. The first connection portion D5 and the second connection portion D6 are bent, so that the first configuration portion D1 and the second configuration portion D2 are opposite to each other. Here, the first light emitting assembly 122, the second light emitting assembly 124, the third light emitting assembly 126, and the connection assembly 150c are in a 3-in-1 form, and the shape of the first connection portion D5 and the shape of the second connection portion D6 are respectively, for example, U-shaped, which may increase the movement margin during light source assembly and reduce the light source movement interference. The design may reduce the number of parts of a lap connector, and the flexible printed circuit board 152c may be folded to minimize the volume.

Figure 8A:
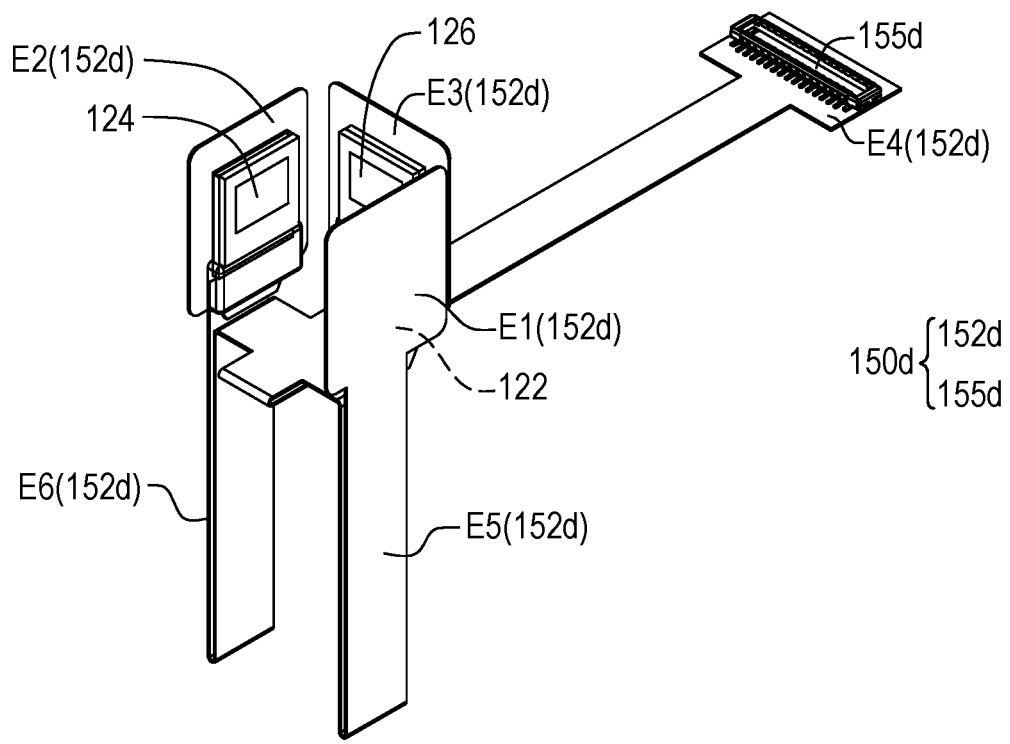
FIG. 8A is a three-dimensional view of a light emitting unit and a connection assembly according to another embodiment of the disclosure.
Figure 8B:
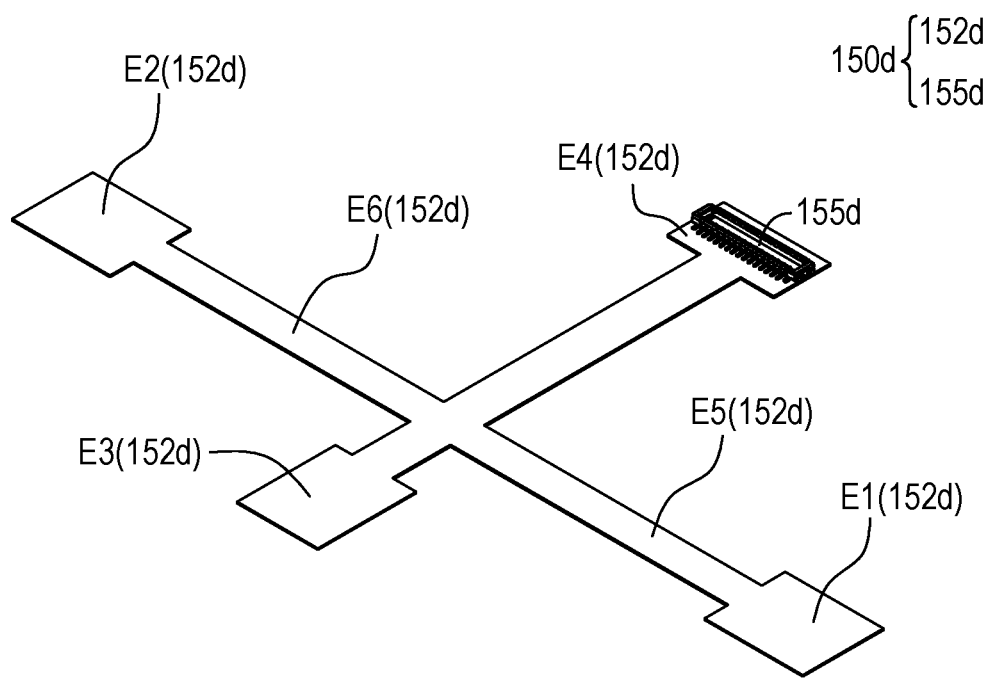
FIG. 8B is a three-dimensional view of the connection assembly of FIG. 8A before being bent.

FIG. 8A is a three-dimensional view of a light emitting unit and a connection assembly according to another embodiment of the disclosure. FIG. 8B is a three-dimensional view of the connection assembly of FIG. 8A before being bent. Please refer to FIG. 8A and FIG. 8B simultaneously. In this embodiment, a connection assembly 150d includes a flexible circuit board 152d and a system connector 155d. The flexible circuit board 152d includes a first configuration portion E1, a second configuration portion E2, a third configuration portion E3, a fourth configuration portion E4, a first connection portion E5, and a second connection portion E6. The first light emitting assembly 122, the second light emitting assembly 124, the third light emitting assembly 126, and the system connector 155d are respectively disposed on the first configuration portion E1, the second configuration portion E2, the third configuration portion E3, and the fourth configuration portion E4. The first connection portion E5 connects the first configuration portion E1 and the third configuration portion E3, and the second connection portion E6 connects the second configuration portion E2 and the third configuration portion E3. The first connection portion E5 and the second connection portion E6 are bent, so that the first configuration portion E1 and the second configuration portion E2 are opposite to each other. Here, the first light emitting assembly 122, the second light emitting assembly 124, the third light emitting assembly 126, and the connection assembly 150d are in a 3-in-1 form, and the shape of the first connection portion E5 and the shape of the second connection portion E6 are respectively, for example, strip-shaped, which may increase the movement margin during light source assembly and reduce the light source movement interference. The design may reduce the number of parts of the lap connector, and the flexible printed circuit board 152d may be folded to minimize the volume.

Figure 9:
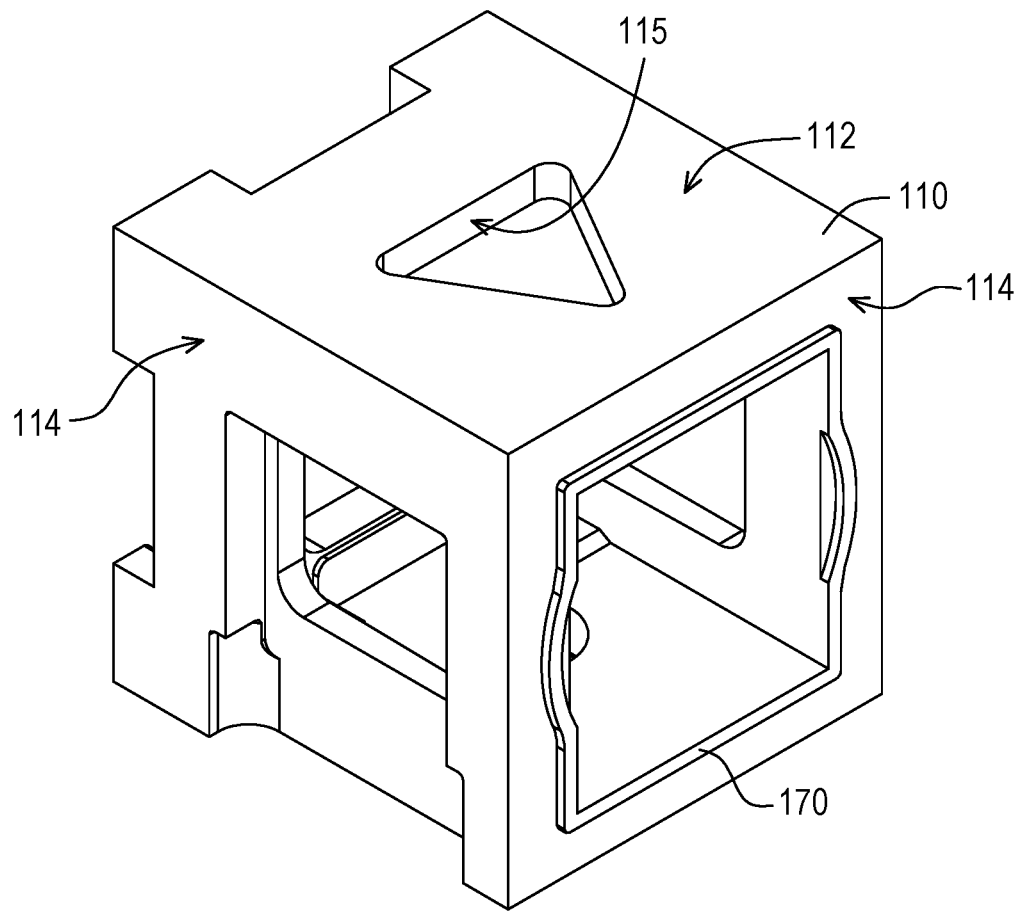
FIG. 9 is a three-dimensional view of an optical engine main body and an anti-glue overflow structure according to another embodiment of the disclosure.

FIG. 9 is a three-dimensional view of an optical engine main body and an anti-glue overflow structure according to another embodiment of the disclosure. Please refer to FIG. 5 and FIG. 9 simultaneously. In this embodiment, the projection device 100 may further include a glue dispensing groove G (shown in FIG. 5) and an anti-glue overflow structure 170 (shown in FIG. 9), and the optical engine main body 110 includes a positioning surface 112 and multiple connection surfaces 114. Each connection surface 114 is adjacent to the positioning surface 112, and the light emitting unit 120 and the projection lens 140 are respectively connected to the connection surfaces 114 of the optical engine main body 110. The light emitting unit 120 and the projection lens 140 may be respectively connected to the connection surfaces 114 by means such as gluing, snapping, and/or positioning holes. The glue dispensing groove G is configured to pre-dispense glue before the optical engine main body 110 and the light emitting unit 120 or the projection lens 140 are positioned and assembled, so that the corresponding light emitting unit 120 or projection lens 140 is glued to the connection surface 114 after positioning and assembling. In another embodiment, each connection surface 114 may not have a glue dispensing groove, and the connection surface 114 may be directly pre-dispensed glue, so that the corresponding light emitting unit 120 or projection lens 140 is glued to the connection surface 114 after positioning and assembling. The anti-glue overflow structure 170 is disposed on at least one of the connection surfaces 114, wherein the anti-glue overflow structure 170 may be located at at least one of between the optical engine main body 110 and the at least one light emitting unit 120 and between the optical engine main body 110 and the projection lens 140, so as to prevent glue from overflowing and sticking to internal optical components during assembly. The offset of the at least one light emitting unit 120 or the projection lens 140 due to the shrinkage and pulling of glue curing may be avoided.

Figure 10:
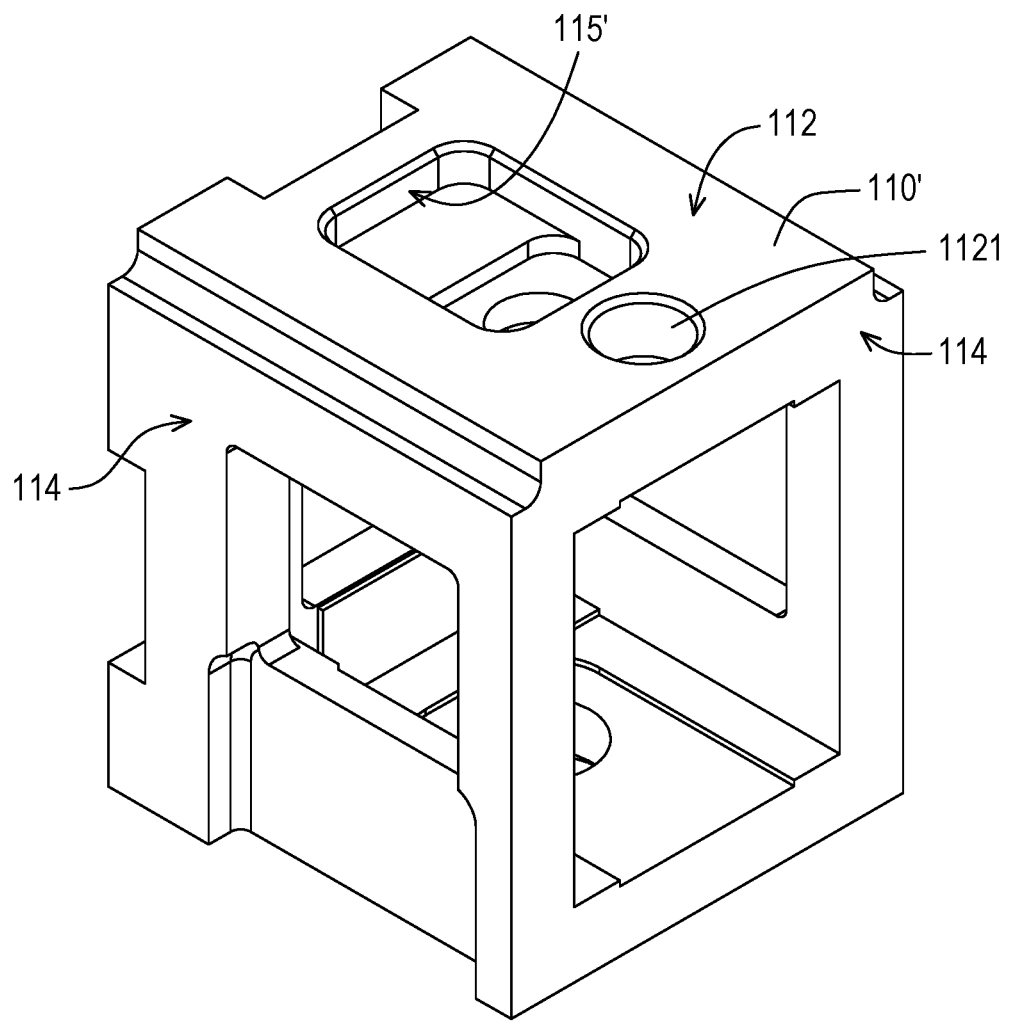
FIG. 10 is a three-dimensional view of an optical engine main body according to another embodiment of the disclosure.

In addition, the optical engine main body 110 of this embodiment includes a positioning portion 115, wherein a shape of the positioning portion 115 is N-gon, and N≥3, the positioning surface is located on the positioning surface 112. It should be noted that the disclosure does not limit the specific appearance of the positioning portion 115. As shown in FIG. 10, a positioning portion 115' of an optical engine main body 110' may also be in the shape of a groove and is located on the positioning surface 112. In more detail, please refer to FIG. 4 and FIG. 10 simultaneously. Positioning portions 115' and 115" may include at least one positioning side, and the positioning side may be linear or arc-shaped. In another embodiment, as shown in FIG. 10, the positioning surface 112 may further include a positioning hole 1121. The design of the positioning portion 115, 115', or 115" and the positioning hole 1121 may increase the contact area between a positioning machine and the optical engine main body 110 or 110' to increase the suction force and friction force between the positioning machine and the optical engine main body 110 or 110'. During the process of assembling the projection device 100, the positioning portions 115, 115', and 115" may be positioned by the positioning machine, so that the projection device 100 may be accurately assembled. The positioning machine may also perform six-axis (up and down, left and right, and front and rear) positioning of the light emitting unit 120 of the projection device 100, and the accuracy thereof may reach, for example, 4 μm. In an embodiment, the positioning machine is, for example, an auto alignment (AA) optical engine.

In another embodiment, the positioning surface 112 may be a plane without a positioning portion. Further, if a chuck of the positioning machine is a vacuum suction head, a pressure suction via may be formed inside the chuck to suck the optical engine main bodies 110 and 110'. Alternatively, if the chuck of the fixture is a magnetic suction head, the optical engine main bodies 110 and 110' may be made of metal or magnetically conductive materials, which may increase the suction force between the fixture and the optical engine main bodies 110 and 110'. Of course, the chuck of the positioning machine may also use the combined design of the magnetic suction head and the vacuum suction head to increase the suction force. Since the positioning surface 112 of the optical engine main body 110 or 110' corresponding to the positioning machine is a plane, deformation of the optical engine main body 110 or 110' during assembly of the projection device 100 may be avoided.

Figure 11:
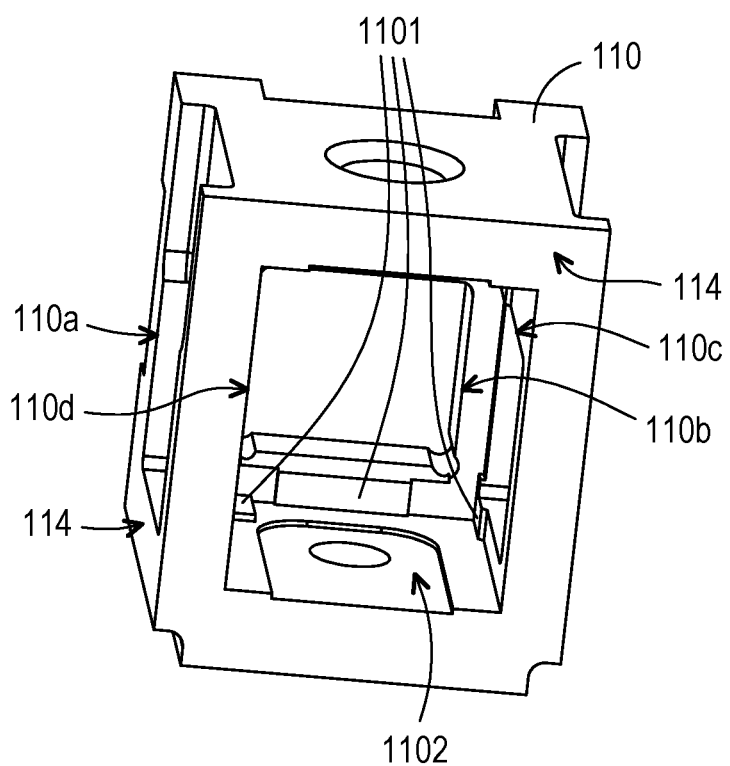
FIG. 11 is a three-dimensional view of an optical engine main body according to an embodiment of the disclosure.
Figure 12:
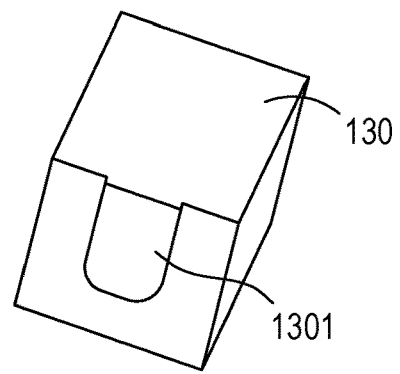
FIG. 12 is a three-dimensional view of an optical combiner according to an embodiment of the disclosure.

FIG. 11 is a three-dimensional view of an optical engine main body according to an embodiment of the disclosure. FIG. 12 is a three-dimensional view of an optical combiner according to an embodiment of the disclosure. Please refer to FIG. 11 and FIG. 12. The optical engine main body 110 is, for example, a frame body and has multiple openings 110a to 110d. The optical combiner 130 is disposed in the optical engine main body 110. The light emitting unit 120 faces the optical combiner 130 respectively through the openings 110a to 110c of the optical engine main body 110. The optical engine main body 110 of this embodiment has multiple positioning structures. In this embodiment, the optical engine main body 110 is embodied as having three positioning blocks 1101 and one positioning chute 1102, and the optical combiner 130 is positioned on the positioning structures. Specifically, the three positioning blocks 1101 respectively abut against the optical combiner 130 in three mutually perpendicular axes. Moreover, as shown in FIG.

10, the optical combiner 130 has a boss 1301 corresponding to the positioning chute 1102, and the boss 1301 is positioned on the positioning chute 1102 in a sliding manner. The optical combiner 130 is, for example, a light combining prism, X cube or other optical elements capable of combining multiple light paths, and the material of the optical combiner 130 is, for example, glass or transparent plastic.

Figure 13:
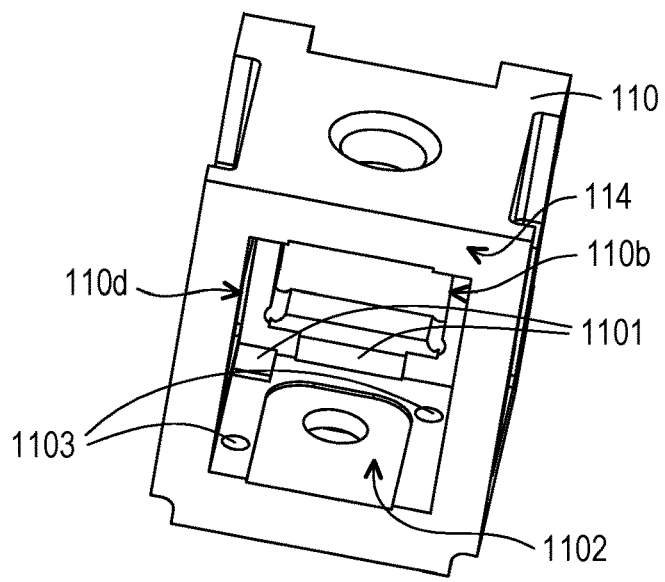
FIG. 13 is a three-dimensional view of an optical engine main body according to another embodiment of the disclosure.
Figure 14:
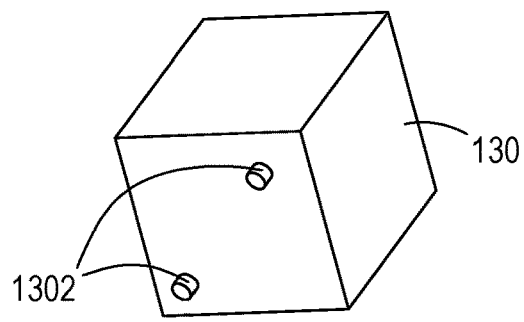
FIG. 14 is a three-dimensional view of an optical combiner corresponding to the optical engine main body of FIG. 13.

The positioning structure of the embodiment of the disclosure has various forms, which are illustrated in the drawings below. FIG. 13 is a three-dimensional view of an optical engine main body according to another embodiment of the disclosure. FIG. 14 is a three-dimensional view of an optical combiner corresponding to the optical engine main body of FIG. 13. The difference between the embodiment shown in FIG. 13 and FIG. 14 and the foregoing embodiment (FIG. 11 and FIG. 12) is that the positioning structure of the optical engine main body 110 shown in FIG. 13 further includes multiple positioning holes 1103, which are embodied as two positioning holes 1103 in this embodiment, on a plane. The optical combiner 130 shown in FIG. 14 correspondingly has positioning protrusions 1302, which are embodied as two positioning protrusions 1302 in this embodiment. The positioning protrusions 1302 of the optical combiner 130 may be positioned in the positioning holes 1103 of the optical engine main body 110. In another embodiment, the positioning structure of the optical engine main body 110 may only include three positioning blocks 1101, and the optical combiner 130 is positioned on the optical engine main body 110 by supporting an outer surface of the optical combiner 130 on the three positioning blocks 1101. Alternatively, the positioning structure of the optical engine main body 110 may only include two positioning blocks 1101 and one positioning chute 1102. The embodiment of the disclosure does not limit the specific number of the positioning block 1101 and the positioning chute 1102.

Figure 15:
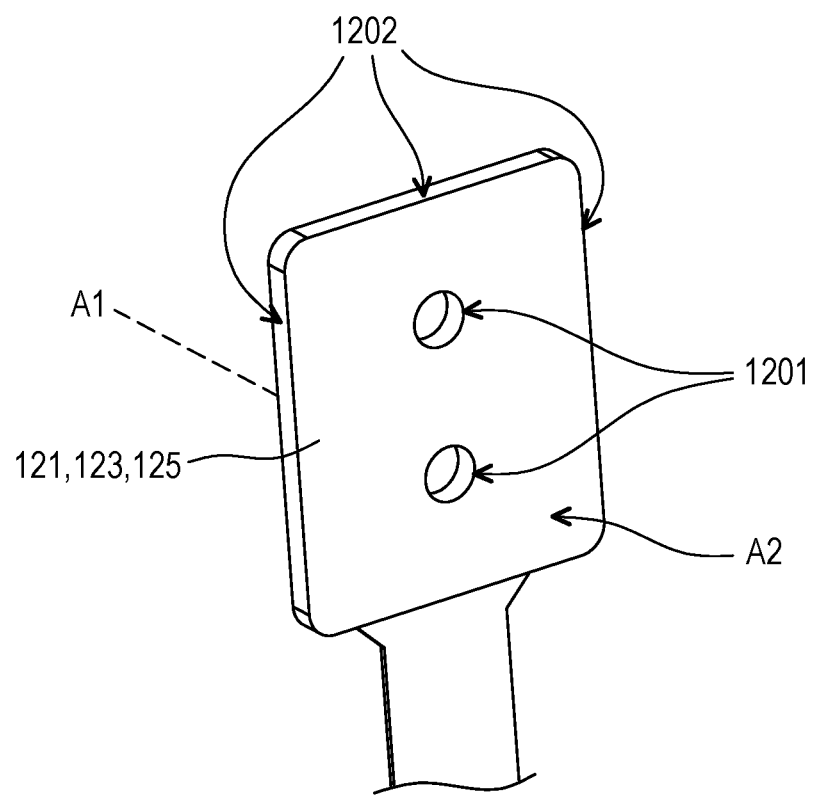
FIG. 15 is a three-dimensional view of a back plate of the light emitting unit of FIG. 6A.

FIG. 15 is a three-dimensional view of a back plate of the light emitting unit of FIG. 6A. A back plate 124 has a front surface A1 and a back surface A2 opposite to each other. The front surface A1 faces the optical engine main body 110 (shown in FIG. 6A). The light emitting assembly 122 is disposed on the front surface A1 and faces the optical combiner 130 in the optical engine main body 110. In this embodiment, the light emitting unit 120 is fixedly connected to the optical engine main body 110. More specifically, the light emitting unit 120 is fixedly connected to the optical engine main body 110 through, for example, a structural feature of the front surface A1 or additional structural members.

In an embodiment, the light emitting unit 120 further has a second positioning portion, and the second positioning portion is embodied as having a positioning hole 1201 and a positioning edge 1202. The positioning hole 1201 is located on the back surface A2 of the back plate 121, 123, or 125, and the positioning edge 1202 is a side edge of the back plate 121, 123, or 125. In other embodiments, a positioning machine may not only position the positioning hole 1201 and/or the positioning edge 1202 of the back plate 124 as described above, but also position a light transmitting cover glass of the light emitting assembly 122. For example, the positioning machine may precisely position the light emitting unit 120 of the projection device 100. The back surface A2 of the back plate 121, 123, or 125 may be lapped with the heat sink 160 (shown in FIG. 5). More specifically, the heat sink 160 may be bent and positioned on the positioning edge 1202 of the back plate 121, 123, or 125 of the light emitting unit 120', so the positioning process between each light emitting assembly and the heat sink 160 is relatively easy. In addition, the heat sink 160 is located between the back plate 121, 123, or 125 and the optical waveguide element 12 (please refer to FIG. 1 and FIG. 2) to improve the heat dissipating efficiency.

In summary, the embodiments of the disclosure have at least one of the following advantages or effects. In the design of the projection device of the disclosure, the light emitting unit is connected to the flexible circuit board, and the light emitting unit is electrically connected to the system connector through the flexible circuit board. Since the flexible circuit board is flexible and suitable for being bent and folded to minimize the volume, the projection device of the disclosure may meet the design requirement of reducing the volume. In addition, since the illumination beam emitted by the light emitting unit becomes the image beam after being guided by the optical combiner, the illumination beam may be directly projected to the optical waveguide element by the projection lens to display the image. In addition, the optical combiner is accurately positioned by the positioning structure of the optical engine main body, and the optical engine main body and the light emitting unit may have the positioning portion for positioning by the positioning machine during the assembling process. Compared with the structure of adopting a light emitting diode module in cooperation with a digital micromirror device for a projection device in a conventional head-mounted display device, the wearable display device and the projection device of the disclosure may omit the configuration of the digital micromirror device or other types of light valves, and there is no need to cooperate with a complex optical path guidance and imaging system, which is more in line with the design requirements of reducing the volume and weight.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wearable display device, comprising:
an optical waveguide element; and
a projection device, comprising:
an optical engine main body, comprising a positioning portion, a positioning surface and a plurality of connection surfaces, wherein each of the connection surfaces is adjacent to the positioning surface, and the positioning portion is located on the positioning surface;
at least one light emitting unit, comprising a first light emitting assembly, a second light emitting assembly, and a third light emitting assembly, wherein the at least one light emitting unit is connected to the optical engine main body and configured to emit at least one illumination beam;
an optical combiner, disposed in the optical engine main body and located on a transmission path of the at least one illumination beam, wherein the optical combiner is configured to guide the at least one illumination beam to generate an image beam;
a projection lens, connected to the optical engine main body, located on a transmission path of the image beam, and configured to project the image beam toward the optical waveguide element; and
a connection assembly, comprising at least one flexible circuit board and a system connector, wherein the system connector is disposed on the at least one flexible circuit board, the first light emitting assembly, the second light emitting assembly and the third light emitting assembly are connected to the at least one flexible circuit board and electrically connected to the system connector through the flexible circuit board, and the first light emitting assembly, the second light emitting assembly, the third light emitting assembly and the projection lens are respectively connected to the connection surfaces of the optical engine main body.

2. The wearable display device according to claim 1, wherein the at least one light emitting unit comprises a plurality of back plates, and the first light emitting assembly, the second light emitting assembly and the third light emitting assembly are respectively disposed on the back plates.

3. The wearable display device according to claim 1, wherein the projection device further comprises an anti-glue overflow structure, the anti-glue overflow structure is disposed on at least one of the connection surfaces, the anti-glue overflow structure is located at at least one of between the optical engine main body and the at least one light emitting unit and between the optical engine main body and the projection lens.

4. The wearable display device according to claim 1, wherein the positioning portion is in a shape of a groove.

5. The wearable display device according to claim 1, wherein a shape of the positioning portion is N-gon, and N≥3.

6. The wearable display device according to claim 1, wherein a material of the optical engine main body comprises a magnetically conductive material.

7. The wearable display device according to claim 1, wherein the projection device further comprises a heat sink, the heat sink is bent and positioned on the at least one light emitting unit, and the heat sink is located between the at least one light emitting unit and the optical waveguide element.

8. A wearable display device, comprising:
an optical waveguide element; and
a projection device, comprising:
an optical engine main body;
at least one light emitting unit, connected to the optical engine main body and configured to emit at least one illumination beam;
an optical combiner, disposed in the optical engine main body and located on a transmission path of the at least one illumination beam, wherein the optical combiner is configured to guide the at least one illumination beam to generate an image beam;
a projection lens, connected to the optical engine main body, located on a transmission path of the image beam, and configured to project the image beam toward the optical waveguide element; and
a connection assembly, comprising at least one flexible circuit board and a system connector, wherein the system connector is disposed on the at least one flexible circuit board, the at least one light emitting unit is connected to the at least one flexible circuit board, and the at least one light emitting unit is electrically connected to the system connector through the flexible circuit board,
wherein the at least one light emitting unit comprises a first light emitting assembly, a second light emitting assembly, and a third light emitting assembly, the flexible circuit board comprises a first configuration portion, a second configuration portion, a third configuration portion, a fourth configuration portion, a first connection portion, and a second connection portion, the first light emitting assembly, the second light emitting assembly, the third light emitting assembly, and the system connector are respectively disposed on the first configuration portion, the second configuration portion, the third configuration portion, and the fourth configuration portion, the first connection portion connects the first configuration portion and the third configuration portion, the second connection portion connects the second configuration portion and the third configuration portion, the first connection portion and the second connection portion are bent, so that the first configuration portion and the second configuration portion are opposite to each other.

9. The wearable display device according to claim 8, wherein a shape of the first connection portion and a shape of the second connection portion are strip-shaped or U-shaped.

10. A wearable display device, comprising:
an optical waveguide element; and
a projection device, comprising:
an optical engine main body;
at least one light emitting unit, connected to the optical engine main body and configured to emit at least one illumination beam;
an optical combiner, disposed in the optical engine main body and located on a transmission path of the at least one illumination beam, wherein the optical combiner is configured to guide the at least one illumination beam to generate an image beam;

a projection lens, connected to the optical engine main body, located on a transmission path of the image beam, and configured to project the image beam toward the optical waveguide element; and a connection assembly, comprising at least one flexible circuit board and a system connector, wherein the system connector is disposed on the at least one flexible circuit board, the at least one light emitting unit is connected to the at least one flexible circuit board, and the at least one light emitting unit is electrically connected to the system connector through the flexible circuit board, wherein the at least one light emitting unit comprises a first light emitting assembly, a second light emitting assembly, and a third light emitting assembly, the connection assembly further comprises a first connector and a second connector, the at least one flexible circuit board comprises a first flexible circuit board, a second flexible circuit board, and a third flexible circuit board, wherein the first light emitting assembly and the first connector are disposed on the first flexible circuit board, the second light emitting assembly and the second connector are disposed on the second flexible circuit board, the third light emitting assembly and the system connector are disposed on the third flexible circuit board, the first light emitting assembly and the second light emitting assembly are lapped onto the third flexible circuit board through at least one of the first connector and the second connector.

11. The wearable display device according to claim 10, wherein the first connector, the second connector, and the system connector are located on a same side of the third flexible circuit board.

12. The wearable display device according to claim 10, wherein the first connector and the second connector are located on a first surface of the third flexible circuit board, and the system connector is located on a second surface opposite to the first surface of the third flexible circuit board.

13. A projection device, comprising:
an optical engine main body, comprising a positioning portion, a positioning surface and a plurality of connection surfaces, wherein each of the connection surfaces is adjacent to the positioning surface, and the positioning portion is located on the positioning surface;

at least one light emitting unit, comprising a first light emitting assembly, a second light emitting assembly, and a third light emitting assembly, wherein the at least one light emitting unit is connected to the optical engine main body and configured to emit at least one illumination beam;

an optical combiner, disposed in the optical engine main body and located on a transmission path of the at least one illumination beam, wherein the optical combiner is configured to guide the at least one illumination beam to generate an image beam;

a projection lens, connected to the optical engine main body and located on a transmission path of the image beam; and a connection assembly, comprising at least one flexible circuit board and a system connector, wherein the system connector is disposed on the at least one flexible circuit board, the first light emitting assembly, the second light emitting assembly and the third light emitting assembly are connected to the at least one flexible circuit board and electrically connected to the system connector through the flexible circuit board, and the first light emitting assembly, the second light emitting assembly, the third light emitting assembly and the projection lens are respectively connected to the connection surfaces of the optical engine main body.

14. The projection device according to claim 13, wherein the at least one light emitting unit comprises a plurality of back plates, and the first light emitting assembly, the second light emitting assembly and the third light emitting assembly are respectively disposed on the back plates.

15. The projection device according to claim 13, further comprising:
an anti-glue overflow structure, disposed on at least one of the connection surfaces, wherein the anti-glue overflow structure is located at at least one of between the optical engine main body and the at least one light emitting unit and between the optical engine main body and the projection lens.

16. The projection device according to claim 13, wherein the positioning portion is in a shape of a groove.

17. The projection device according to claim 13, wherein a shape of the positioning portion is N-gon, and N≥3.

18. The projection device according to claim 13, wherein a material of the optical engine main body comprises a magnetically conductive material.

19. The projection device according to claim 13, further comprising:
a heat sink, bent and positioned on the at least one light emitting unit.

20. A projection device, comprising:
an optical engine main body;
at least one light emitting unit, connected to the optical engine main body and configured to emit at least one illumination beam;

an optical combiner, disposed in the optical engine main body and located on a transmission path of the at least one illumination beam, wherein the optical combiner is configured to guide the at least one illumination beam to generate an image beam;

a projection lens, connected to the optical engine main body, located on a transmission path of the image beam, and configured to project the image beam toward the optical waveguide element; and a connection assembly, comprising at least one flexible circuit board and a system connector, wherein the system connector is disposed on the at least one flexible circuit board, the at least one light emitting unit is connected to the at least one flexible circuit board, and the at least one light emitting unit is electrically connected to the system connector through the flexible circuit board, wherein the at least one light emitting unit comprises a first light emitting assembly, a second light emitting assembly, and a third light emitting assembly, the flexible circuit board comprises a first configuration portion, a second configuration portion, a third configuration portion, a fourth configuration portion, a first connection portion, and a second connection portion, the first light emitting assembly, the second light emitting assembly, the third light emitting assembly, and the system connector are respectively disposed on the first configuration portion, the second configuration portion, the third configuration portion, and the fourth configuration portion, the first connection portion connects the first configuration portion and the third configuration portion, the second connection portion connects the second configuration portion and the third configuration portion, the first connection portion and the second connection portion are bent, so that the first configuration portion and the second configuration portion are opposite to each other.

21. The projection device according to claim 20, wherein a shape of the first connection portion and a shape of the second connection portion are strip-shaped or U-shaped.

22. A projection device, comprising:

an optical engine main body;

at least one light emitting unit, connected to the optical engine main body and configured to emit at least one illumination beam;

an optical combiner, disposed in the optical engine main body and located on a transmission path of the at least one illumination beam, wherein the optical combiner is configured to guide the at least one illumination beam to generate an image beam;

a projection lens, connected to the optical engine main body, located on a transmission path of the image beam, and configured to project the image beam toward the optical waveguide element; and a connection assembly, comprising at least one flexible circuit board and a system connector, wherein the system connector is disposed on the at least one flexible circuit board, the at least one light emitting unit is connected to the at least one flexible circuit board, and the at least one light emitting unit is electrically connected to the system connector through the flexible circuit board, wherein the at least one light emitting unit comprises a first light emitting assembly, a second light emitting assembly, and a third light emitting assembly, the connection assembly further comprises a first connector and a second connector, the at least one flexible circuit board comprises a first flexible circuit board, a second flexible circuit board, and a third flexible circuit board, wherein the first light emitting assembly and the first connector are disposed on the first flexible circuit board, the second light emitting assembly and the second connector are disposed on the second flexible circuit board, the third light emitting assembly and the system connector are disposed on the third flexible circuit board, the first light emitting assembly and the second light emitting assembly are lapped onto the third flexible circuit board through at least one of the first connector and the second connector.

23. The projection device according to claim 22, wherein the first connector, the second connector, and the system connector are located on a same side of the third flexible circuit board.

24. The projection device according to claim 22, wherein the first connector and the second connector are located on a first surface of the third flexible circuit board, and the system connector is located on a second surface opposite to the first surface of the third flexible circuit board.

* * * * *